Sept. 4, 1945.  J. H. WIGGINS  2,384,147
LIQUID SEALED VENT VALVE
Filed Aug. 28, 1943   3 Sheets-Sheet 1

INVENTOR;
JOHN H. WIGGINS
By Wells L. Church
ATTORNEY

Sept. 4, 1945.　　　J. H. WIGGINS　　　2,384,147
LIQUID SEALED VENT VALVE
Filed Aug. 28, 1943　　　3 Sheets-Sheet 3

INVENTOR:
JOHN H. WIGGINS
By Wells L. Church
ATTORNEY

Patented Sept. 4, 1945

2,384,147

UNITED STATES PATENT OFFICE 2,384,147

LIQUID SEALED VENT VALVE

John H. Wiggins, Chicago, Ill.

Application August 28, 1943, Serial No. 500,446

8 Claims. (Cl. 137—53)

This invention relates to liquid sealed valves of the kind that are used to provide pressure and/or vacuum relief to tanks or containers in which gases and/or volatile liquids are stored, and has for its main object to provide a reliable vent valve of simple design that will not freeze in cold weather, and which is of such construction that a single filling of the sealing liquid suffices to maintain the valve in an operative condition for a long period.

Another object is to provide a vent valve of the general kind referred to, which is of such design that in the event the depth of the body of sealing liquid becomes diminished from any cause, as, for example, evaporation, or entrainment of the liquid with a gaseous medium flowing past the control element, the supporting surface on which said body of liquid rests, will rise, and thus maintain the sealing liquid in proper functional relationship with the control element or elements of the valve which said liquid seals, notwithstanding the fact that the volume of the sealing liquid is considerably less than when the reservoir of the valve was first filled with sealing liquid.

Another object is to provide a vent valve of the kind above referred to, in which rain water or condensed moisture is used to constitute the vertically-movable supporting surface for the sealing liquid that rises gradually in the event the depth of the sealing liquid becomes diminished, and thus compensates for the diminution in the volume of the sealing liquid.

Another object is to provide a vent valve of the kind last mentioned, which is of such design that water in excess of that required to maintain the proper functional relationship between the sealing liquid and the control element or elements of the valve, is automatically discharged from the valve structure.

Another object is to provide a liquid-sealed pressure and/or vacuum vent valve of novel construction, that is equipped with a single reservoir for the sealing liquid.

In the accompanying drawings I have illustrated my invention embodied in a valve that is adapted to be mounted on a tank in which volatile liquids are stored, and which has provision for providing pressure relief and vacuum relief for the tank. I wish it to be understood, however, that my invention is applicable to valves used solely to provide pressure relief and to valves used solely to provide vacuum relief, on any type or kind of closed container.

Figure 4:
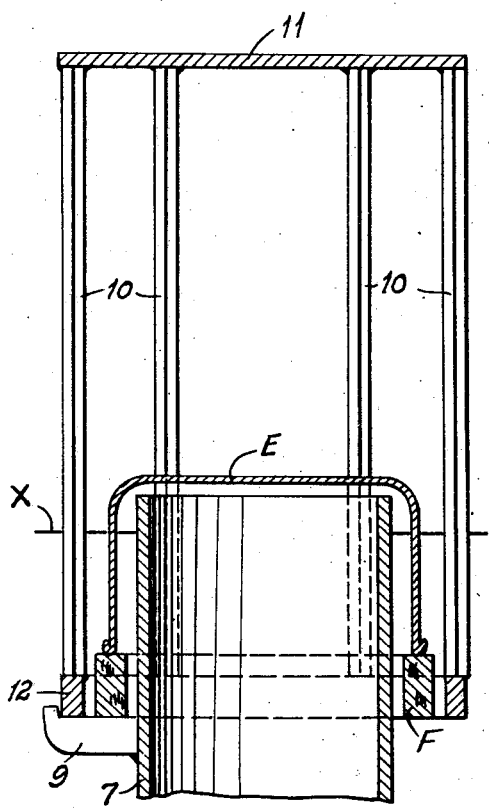
Figure 5:
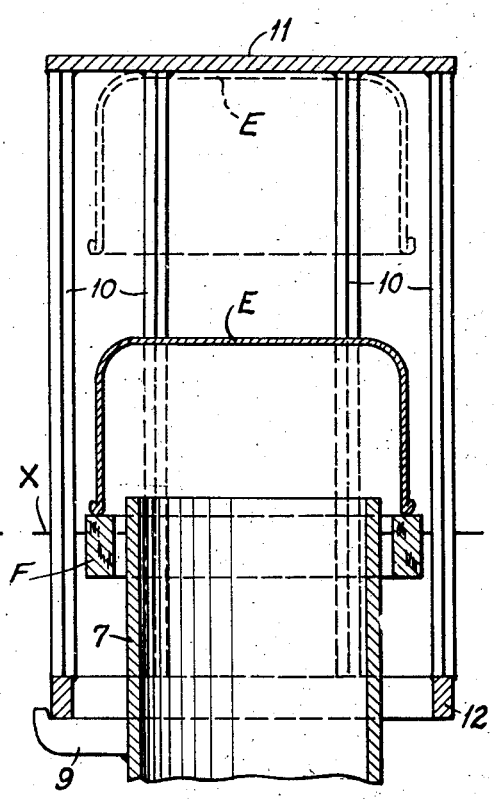

Figure 4 is an enlarged, vertical sectional view of one of the control elements, for example, the control element of the pressure vent, showing said element in its normal closed position; and Figure 5 is a view similar to Figure 4, showing in full lines, the position of said control element when it is about to leave its coacting floating seat, and showing, in broken lines, the position of said control element after it has separated from its seat to provide pressure relief for the container.

Briefly described, my improved valve comprises a reservoir adapted to hold a relatively large quantity of a suitable sealing liquid, and constructed so that water can be used in the bottom portion of said reservoir to constitute a supporting surface on which the sealing liquid floats, a housing provided with two compartments, i. e., a pressure relief compartment, which always is in communication with the atmosphere, and a vacuum relief compartment, which always is in communication with the interior of the tank or container on which the valve is used, and two separate control elements, normally sealed by the liquid in the reservoir and arranged so that one of said control elements normally cuts off communication between the pressure relief compartment and the tank, and the other control element normally cuts off communication between the atmosphere and the vacuum relief compartment. Said control elements are of identical construction, and each consists of a substantially inverted, cup-shaped member mounted on the upper end of a tubular duct or passageway and arranged with its lower end portion submerged in the sealing liquid. When a certain approximate pressure is created in the tank, the control element associated with the pressure relief compartment will move vertically sufficiently to unseal itself, thereby permitting gases to pass from the tank into the pressure relief compartment, and thence escape to the atmosphere, so as to provide pressure relief for the tank. Similarly, when a certain approximate vacuum or minus pressure is created in the tank, the control element associated with the vacuum relief compartment will move vertically sufficiently to unseal itself, whereupon air will enter the vacuum relief compartment, and thence pass into the tank so as to provide vacuum relief for the tank.

The reservoir and housing can be constructed in various ways without departing from the spirit of my invention, but I prefer to use a reservoir open at its upper end, and construct the housing so that it is removably mounted in the reservoir, said housing being open at its lower end and the side wall portion of said housing being made of such length or depth that when the housing is in operative position, its lower end is submerged in and effectively sealed by the liquid in the reservoir. A vertical partition divides the interior of the housing into two chambers, the one which constitutes the vacuum relief compartment having a gas-tight top, and the other chamber preferably having a removable top or lid that serves as a weather cover for the pressure relief compartment, which, as previously stated, is open to the atmosphere.

A vertically-disposed, tubular member that is positioned in the reservoir, and which projects downwardly through the bottom of said reservoir, constitutes a combined vacuum and pressure passageway, said tubular member having an upwardly-projecting extension that terminates inside of the vacuum relief compartment above the level of the sealing liquid in said compartment, and said tubular member also having an L-shaped branch whose vertical portion terminates inside of the pressure relief compartment above the level of the sealing liquid in said compartment. The vertical portion of the L-shaped branch just referred to, will hereinafter be referred to as a pressure relief duct, and it is normally closed by the control element of the pressure relief compartment. The control element of the vacuum relief compartment normally closes the upper end of a vacuum duct formed by a vertically-disposed, tubular member in the reservoir, whose upper end terminates in the vacuum relief compartment above the level of the liquid in said compartment, and whose lower end projects downwardly through the bottom of the reservoir and is open to the atmosphere.

Preferably, the housing which constitutes the pressure-relief and vacuum-relief compartments, is telescopically mounted in the open upper end of the reservoir, and is proportioned so that there is a space or slot between said housing and the side wall of the reservoir through which rain water or condensed moisture can enter the reservoir and precipitate to the bottom of same, so as to form a supporting layer of water in the reservoir on which the sealing liquid will float. The sealing liquid may be any suitable liquid substance that is immiscible with and lighter than water. Excess water is automatically discharged from the reservoir by an inverted siphon that leads from the lower end of the reservoir.

Figure 1:
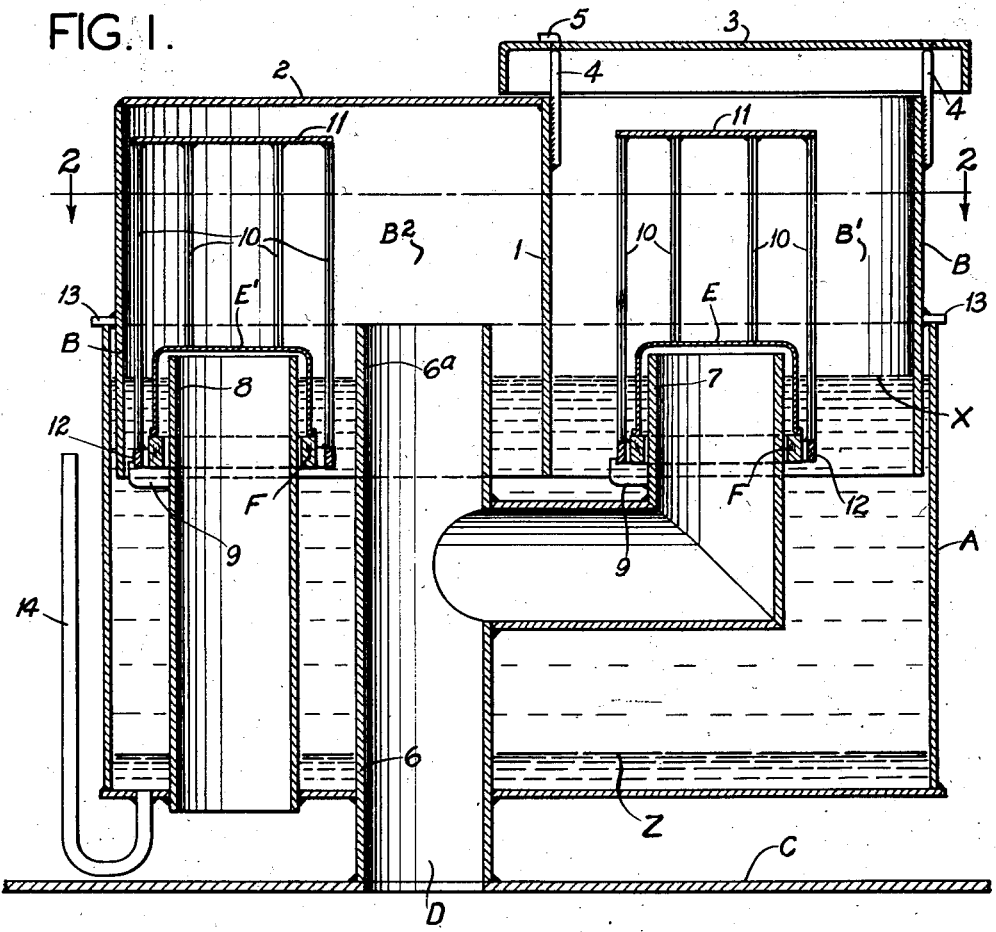
Figure 1 is a vertical sectional view of a combined pressure and vacuum relief vent valve, constructed in accordance with my invention, taken on approximately the line 1—1 of Figure 2, showing the reservoir practically filled with sealing liquid, but containing a small quantity of water on which the sealing liquid floats.
Figure 2:
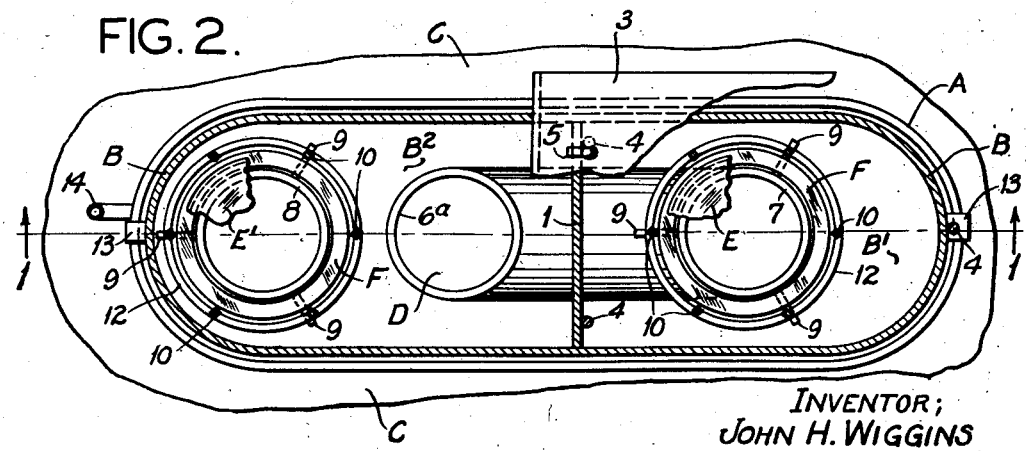
Figure 2 is a horizontal sectional view, taken on the line 2—2 of Figure 1, but showing fragmental portions of the weather cover for the pressure vent and the top portions of the valve cages.

Referring to the drawings which illustrate the preferred form of my invention, A designates the reservoir which is shown in Figures 1 and 2 as consisting of a substantially oblong-shaped receptacle whose upper end is open, said receptacle being adapted to be filled with a sealing liquid $x$ immiscible with water and lighter than water. A housing B that corresponds in shape to the side wall portion of said receptacle but is slightly smaller than same, is telescopically mounted in the reservoir A, with the lower end portion of said housing submerged in the sealing liquid $x$, said housing having a transverse, vertically-disposed partition 1 that divides the interior of the housing into a pressure relief compartment B' and a vacuum relief compartment B². The vacuum relief compartment has a gas-tight top 2, but the pressure relief compartment is open to the air and is provided with a weather cover 3, which is preferably removable. The cover 3 is herein illustrated as being sustained by rigid supports 4 carried by the housing B, and retained in position by hook-shaped devices 5 on the housing that project upwardly through holes in the cover, but obviously, various other means may be used to mount the cover of the pressure relief compartment B' in such a way that said compartment is always in communication with the atmosphere, but rain, snow, and the like, can not beat into said compartment.

Adjacent the center of the reservoir A is a vertically-disposed, tubular member 6 that projects downwardly through the bottom of the reservoir in alignment with a hole in the roof of the container or tank C on which the valve is used, said member being rigidly attached to said roof by a gas-tight joint. The tubular member 6 constitutes a combined pressure and vacuum passageway D, and said member is provided at its upper end with an extension 6ª that projects upwardly into the vacuum relief compartment B² and terminates above the level of the sealing liquid, as shown in Figure 1. Said member 6 is also provided, at a point below the extension 6ª, with an L-shaped branch whose vertical portion 7 constitutes a pressure duct that terminates in the pressure relief compartment B' above the level of the sealing liquid in said compartment. In effect, the tubular member 6 and the portions 6ª and 7 of same, constitutes an inlet for the reservoir, that establishes communication between the container C and the pressure relief compartment B' under certain conditions, and also establishes communication between the container and the vacuum relief compartment B² under certain other conditions. Air is supplied to the vacuum relief compartment B² by a vacuum duct 8 whose upper end terminates in said compartment above the level of the sealing liquid, and whose open lower end portion projects through the bottom of the reservoir and is open to the atmosphere. The two ducts 7 and 8 are normally closed by a pressure relief control element E, and a vacuum relief control element E', respectively, each of which consists of a substantially inverted cup-shaped member mounted on the upper end of the duct and so proportioned that its lower end portion will normally be submerged in the sealing liquid. Each of said control elements contacts with a valve seat F that is herein illustrated as being normally supported by a plurality of laterally-projecting lugs or brackets 9 on the exterior of the duct which the control element surrounds, and each control element is herein illustrated as being maintained in operative relationship with its coacting duct, by a cage formed by a plurality of vertically-disposed guide rods 10, whose upper ends are attached to a cap piece 11, and whose lower ends are attached to a ring 12 that surrounds the valve seat F and rests on the brackets 9.

In order to conserve the sealing liquid and prevent it from being carried out of the reservoir by entrainment with gas that escapes from the tank C or air that is drawn into said tank from the vacuum relief compartment B², the valve seats or contact surfaces on which the control elements E and E' act, when said control elements are in their closed portions, are so constructed or arranged that said seats will be submerged in the sealing liquid below the surface thereof, when said control elements are in their closed position, and will rise upwardly to the surface of the sealing liquid when said control elements move upwardly into their open position. In the form of my invention herein illustrated, the valve seats are formed by the upper ends or top surfaces of buoyant members or floats F of annular form, that surround the tubular members or ducts, on the upper ends of which the control elements are mounted. When the control element (E or E') is in its normal closed position, as shown in Figure 4, the weight of the control element exerts a load or downward force on its co-acting floating valve seat member F and causes said member to rest upon the brackets 9. If the control element starts to rise or move upwardly, due to a positive pressure exerted on the control element E, or a minus pressure exerted on the control element E', the valve seat member F will also move upwardly, as shown in full lines in Figure 5, and the sealing surface at the upper end of said member will remain in contact or engagement with the bottom edge of the control element during a portion of the upward travel of the control element.

The buoyancy of the floating valve seat member F tends to raise the control element with which it is associated, and accordingly, the force that normally maintains the control element in its closed position is the weight of the control element minus the net uplift exerted on the control element by the buoyant valve seat member or float F. The action of both of the control elements E and E' is the same, with the exception, of course, that the element E moves upwardly in response to a positive pressure created in the tank C, and the control element E' moves upwardly in response to a minus pressure created in the tank. Describing the operation of the control element E, I will assume that the pressure in the storage tank is such that the weight of said control element will sink its coacting valve seat member or float F and hold the same on the supporting brackets 9 (see Figure 4). If the pressure increases to a point, which, for convenience, I will refer to as P', the control element E and its co-acting valve seat member F start to rise and will continue to move upwardly, as shown in full lines in Figure 5, until the top surface of the member F, constituting the valve seat, starts to leave the surface of the sealing liquid. If said valve seat member F rises higher, the uplift on the control element E decreases, due to decrease in buoyancy of the floating member F. This will necessitate a slight rise in pressure for the control element E to rise higher to the position shown in broken lines in Figure 5. (There is still a mechanical seal or closure between the control element E and seat on the member F, as shown in full lines in Figure 5, so there is theoretically no escape of gas under the bottom edge of the control element E.) When the control element E and float F have risen as far as the float F will rise out of the liquid, due to its own weight alone, the pressure has risen to a point which I will refer to as P². There is a time lapse between P' and P², because the pressure will require some time to build up. This gives ample time for any liquid trapped on the top side of the valve seat member or float F to drain off. At pressure P² the control element E will rise away from the seat formed by the top face of the float F, as shown in broken lines in Figure 5, but by this time there is practically no liquid on said float, other than enough to lubricate the seat, so that when the control element leaves its seat, there is no entrainment of sealing liquid with air flowing past the float. The seat F is made deep enough so that the pressure head thrown by the weight of the control element E, is less than the depth of the float F when floating with its own weight only, so that sealing liquid will not bubble under or around the float F. For example, if the control element rises at 1" head of sealing liquid, the float F would have to be at least 2" deep, if said float rose half way out of the liquid when floating with its own weight only. In addition to preventing entrainment of the sealing liquid, thus conserving the same, the structure above described effectively prevents the control element from bobbing in and out of the liquid when said control element is opening. The above described feature of my invention is of great commercial value, and is applicable to various types and kinds of liquid-sealed valves.

As previously stated, the housing B is telescopically mounted in the upper end of the reservoir A, and the space between said housing and the side wall portion of the reservoir is sealed by the same body of liquid used to seal the pressure relief control element E and the vacuum relief control element E', said housing being supported by laterally-projecting lugs 13 at the ends of same which rest upon the top edge of the side wall portion of the reservoir, as shown in Figures 1 and 2. Attached to the bottom of the reservoir is an overflow tube 14, preferably of the inverted siphon type that automatically discharges excess water from the reservoir, the upper end of said overflow tube being about ¼" below the bottom edges of the control elements E and E', so that water can never collect in the reservoir deep enough to freeze the bottom edges of said control elements. After the reservoir is properly filled with liquid, said overflow tube 14 absolutely eliminates the possibility of the sealing liquid $x$ rising high enough in the reservoir to escape over the side wall of same, or to escape over the top edges of the tubular members 6ª, 7 or 8.

Figure 3:
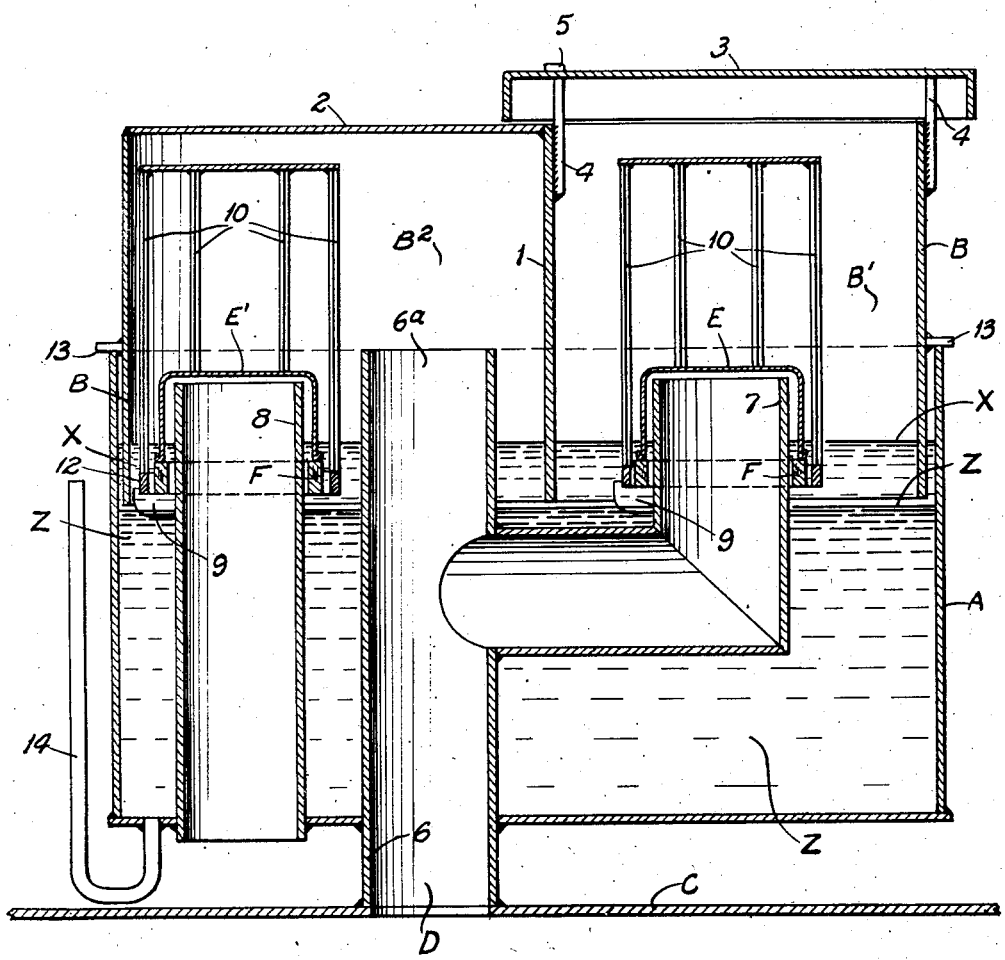
Figure 3 is a view similar to Figure 1, illustrating how the water in the reservoir rises in the event the depth of the sealing liquid diminishes.

Figure 1 shows the valve supplied with its full load of sealing liquid $x$ and a small quantity of water $z$ on which the sealing liquid flows. When it rains, rain water enters the open upper end of the reservoir through the space between the housing B and the side wall portion of the reservoir, and percolates down through the sealing liquid to the bottom of the reservoir or to the water $z$ on which the sealing liquid floats. If the reservoir is "full" of sealing liquid, the rain water discharges through the overflow tube 14 as fast as it runs into the reservoir. If the reservoir is less than "full" of sealing liquid, then enough rain water remains in the reservoir to raise the supporting surface of which the sealing liquid floats (the upper surface of water $z$) high enough until the sealing liquid leg balances the water leg in the overflow tube. If the volume of the sealing liquid becomes diminished, due to entrainment or other causes, the above described process will continue until the volume of the sealing liquid $x$ and the volume of the water $z$ are as shown in Figure 3. It requires a long time, however, for the sealing liquid to become substantially diminished in volume. Hence, with my improved valve, a single filling of sealing liquid will last for several years. During this entire period the control elements E and E' are effectively sealed, even at the end of the period when the depth of the sealing liquid has diminished to the point shown in Figure 3. If it is desired to inspect the valve, this can be accomplished quickly and easily without removing any fastening devices, simply by lifting the housing B out of the reservoir A, and then raising the cages positioned over the control elements E and E', so as to provide access to said elements. When the tank or container C is under pressure, the sealing liquid inside the pressure control element E drops only about as much as the sealing liquid rises in the reservoir, because the sealing liquid in the vacuum relief compartment B² is now dropping too. Vice versa when the tank or container is under a vacuum. This is highly desirable, since when the sealing liquid is, say, only ½" above the bottom edge portion of the pressure relief control element E, a liquid pressure of about 1" must be built up before the gas will bubble under the bottom edge of said control element. Thus, if the control element E is designed to rise at ¾" of the sealing liquid head, then ⅜" of sealing liquid above the bottom of the element E is sufficient to give said element a full pressure seal.

A vent valve of the construction above described not only makes it possible to effectively seal a vertically-movable, pressure operated control element and a vertically movable, vacuum-operated control element, both of which are sealed by liquid confined in a single reservoir, but as previously stated, it eliminates the possibility of the control elements bobbing up and down in the liquid, or gases bubbling violently around said control elements, when the valve is venting to afford pressure or vacuum relief. Entrainment of the sealing liquid is effectively prevented by the floating or floatable members F carrying the seats on which the control elements act; and another desirable feature of said valve is that while it utilizes rain water to compensate for diminution in volume of the sealing liquid and maintain said sealing liquid in proper functional relationship with the control elements E and E', there is no possibility of the valve failing to function properly, due to the overflow tube 14 becoming unprimed, or the sealing liquid becoming displaced by an excess of rain water in the reservoir. The valve has the further desirable characteristic of being of such design and construction, that if water freezes in same, it cannot interfere with the operation of the control elements E and E', or cause any parts of the structure to burst or crack from excessive pressure, resulting from the accumulation of ice.

Having thus described my invention, what I claim as new and desire to secure by Letters Patent is:

1. A vent valve, comprising a reservoir, a vertically-movable control element and a body of liquid that is used to seal said element, said reservoir being so constructed that rain water can enter the same and form a supporting surface on which said sealing liquid floats, and means for causing said supporting surface to automatically assume a level, such as to maintain proper functional relationship between the control element and the sealing liquid, even though the original depth of the body of sealing liquid becomes greatly diminished, due to a reduction in the volume of the sealing liquid.

2. A vent valve, comprising a reservoir, a control element that opens by moving upwardly, said reservoir being charged with sealing liquid in which the lower end portion of said control element is submerged, and said reservoir being so constructed that rain water or condensed moisture can precipitate to the bottom of the reservoir and form a supporting surface on which the sealing liquid floats, and a means providing for escape of excess water from the reservoir, constructed so as to prevent said supporting surface from rising to a height or level great enough to cause or allow the sealing liquid to escape from the reservoir.

3. A vent valve, comprising a reservoir, a vertically-movable control element, said reservoir being charged with sealing liquid in which the lower end portion of said control element is submerged, the upper end of said reservoir being open so that rain water can enter same and precipitate to the bottom of the reservoir, and an inverted siphon shaped tube leading from the bottom of the reservoir and provided with a vertically-disposed water leg whose upper end terminates in a horizontal plane lower than the horizontal plane in which the bottom edge of said control element lies.

4. A vent valve for a closed container, comprising a reservoir having an inlet and charged with a sealing liquid immiscible with and lighter than water, said reservoir being constructed so that rain water or condensed vapor can be utilized to form a supporting surface on which the sealing liquid floats, a pressure relief compartment above the sealing liquid that is in constant communication with the atmosphere and normally cut off from the inlet, a vacuum relief compartment above the sealing liquid that is in constant communication with the inlet and normally cut off from the atmosphere, and control elements sealed by the sealing liquid, for admitting air to the vacuum relief compartment and for providing means of escape of excess pressure from the inlet to said pressure relief compartment.

5. A vent valve of the construction described in claim 4, in which said compartments are formed by a divided housing telescopically mounted in the upper end of the reservoir and having its lower end sealed by the sealing liquid in said reservoir.

6. A vent valve of the construction described in claim 4, in which each of said control elements consists of a substantially inverted, cup-shaped member, mounted so as to move vertically on the upper end of a tubular duct in said reservoir, and having its lower end portion normally submerged in the sealing liquid.

7. A vent valve of the construction described in claim 4, in which an inverted water discharge siphon shaped pipe leads from the bottom of the reservoir.

8. A vent valve provided with a vertically-movable pressure relief element and a vertically-movable vacuum relief element, a single reservoir that holds a body of liquid which seals both of said elements, and means for utilizing rain water or condensed moisture to constitute a supporting surface for the sealing liquid that automatically rises progressively as the volume of the sealing liquid diminishes.

JOHN H. WIGGINS.